(12) United States Patent
Sonoda (10) Patent No.: US 6,484,948 B1
(45) Date of Patent: Nov. 26, 2002

(54) AUTHENTICATION METHOD, AUTHENTICATION APPARATUS, AUTHENTICATION SYSTEM AND IC CARD

(75) Inventor: Kenichiro Sonoda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 129 days.

(21) Appl. No.: 09/635,224

(22) Filed: Aug. 9, 2000

(30) Foreign Application Priority Data

Mar. 14, 2000 (JP) ........................................ 2000-070181

(51) Int. Cl.[7] .............................................. G06K 19/06
(52) U.S. Cl. ........................ 235/492; 235/380; 235/382
(58) Field of Search ................................ 235/370, 380, 235/382, 440, 441, 449, 454

(56) References Cited

U.S. PATENT DOCUMENTS

| 5,382,778 | A | * | 1/1995 | Takahira et al. | ............. | 235/380 |
| 5,546,462 | A | * | 8/1996 | Indeck et al. | .................. | 380/23 |
| 5,548,106 | A | * | 8/1996 | Liang et al. | ................. | 235/454 |
| 6,018,641 | A | * | 1/2000 | Tsubouchi et al. | .......... | 455/38.2 |
| 6,042,006 | A | * | 3/2000 | Van Tilburg et al. | .... | 235/382.5 |
| 6,045,042 | A | * | 4/2000 | Ohno | ........................ | 235/440 |
| 6,045,043 | A | * | 4/2000 | Bashan et al. | ............... | 235/441 |
| 6,164,538 | A | * | 12/2000 | Furuya et al. | ............... | 235/449 |
| 6,199,761 | B1 | * | 3/2001 | Drexler | ........................ | 235/487 |
| 6,213,391 | B1 | * | 4/2001 | Lewis | .......................... | 235/380 |
| 6,318,633 | B1 | * | 11/2001 | Drexler | ........................ | 235/454 |

FOREIGN PATENT DOCUMENTS

| JP | 4-298058 | 10/1992 |
| JP | 6-94787 | 4/1994 |

* cited by examiner

Primary Examiner—Karl D. Frech
Assistant Examiner—Ahshik Kim
(74) Attorney, Agent, or Firm—Oblon, Spivak, McClelland, Maier & Neustadt, P.C.

(57) ABSTRACT

An authentication signal extraction part measures the frequency spectrum of electric noise specific to a semiconductor element for authentication so that a code depending on this frequency spectrum is generated as an authentication signal. An authentication signal storage part previously registers the authentication signal. When performing authentication, the authentication signal generated from the authentication signal extraction part is compared with a registered authentication signal stored in the authentication signal storage part so that a result display part displays successful authentication when coincidence is recognized. Thus, authentication is performed without forming a nonvolatile memory or writing the authentication signal.

10 Claims, 10 Drawing Sheets

AUTHENTICATION METHOD, AUTHENTICATION APPARATUS, AUTHENTICATION SYSTEM AND IC CARD

BACKGROUND OF THE INVENTION

1. Field of the Invention

The present invention relates to an authentication method, an authentication apparatus, an authentication system and an IC card.

2. Description of the Background Art

In order to enable only registered users to use services provided by a common carrier, a procedure of authentication is necessary for determining whether or not the users are registered. In general authentication utilizing a semiconductor element with an IC card or the like, for example, the semiconductor element formed as a nonvolatile memory preserves a number serving as an authentication signal for determining whether or not the user using the IC card or the like is registered on the basis of whether or not the number coincides with a registered number.

In such conventional authentication, however, it is necessary to form the nonvolatile memory for preserving the authentication signal in a semiconductor integrated circuit in the first place, and to write the authentication signal in the nonvolatile memory in the second place.

SUMMARY OF THE INVENTION

According to a first aspect of the present invention, an authentication method comprises steps of (a) obtaining an authentication signal on the basis of electric noise of a semiconductor element and (b) comparing the authentication signal obtained in the step (a) with each of at least one registered authentication signal and determining coincidence in any comparison.

In the authentication method according to the first aspect, the electric noise of the semiconductor element is specific to each element and hence the authentication signal obtained on the basis thereof is also specific to each element. Therefore, it is not necessary to form a nonvolatile memory or write the authentication signal for implementing authentication but the semiconductor element may simply be manufactured through the same manufacturing steps. Thus, authentication can be simply performed at a low cost.

According to a second aspect of the present invention, the authentication method further comprises a step of (c) recording the authentication signal as one of at least one registered authentication signal.

In the authentication method according to the second aspect, a semiconductor element for which an authentication signal has already been obtained can be distinguished from other ones to be authenticated.

According to a third aspect of the present invention, the step (b) comprises steps of (b-1) determining whether or not at least one registered authentication signal is present and (b-2) comparing each of at least one registered authentication signal with the authentication signal and determining coincidence in any comparison when a positive determination is obtained in the step (b-1), and wherein the authentication signal is recorded as one of at least one registered authentication signal in the step (c) only when a negative determination is obtained in the step (b-1) or a negative determination is obtained in the step (b-2).

In the authentication method according to the third aspect, an authentication signal intended to be newly registered is registered only when there is no registered authentication signal coinciding with the authentication signal, whereby double registration can be prevented.

According to a fourth aspect of the present invention, the step (a) includes a step (a-1) of measuring the electric noise with respect to the semiconductor element thereby obtaining a code or codes depending on the frequency spectrum of the electric noise as the authentication signal.

In the authentication method according to the fourth aspect, a code varying with each semiconductor element while reflecting noise specific to the semiconductor element is obtained as the authentication signal.

According to a fifth aspect of the present invention, the semiconductor element comprises a plurality of unit semiconductor elements, and the step (a-1) comprises a step (a-1-1) of measuring electric noise with respect to the respective ones of the plurality of unit semiconductor elements thereby obtaining codes depending on the frequency spectra of the electric noise and regarding a set of the codes as the authentication signal.

In the authentication method according to the fifth aspect, the codes depending on the frequency spectra of the plurality of unit semiconductor elements are obtained as the authentication signal, whereby it is possible to reduce such a possibility that the same authentication signal is obtained although the semiconductor elements are different from each other. Thus, the range of users requiring authentication can be further enlarged.

According to a sixth aspect of the present invention, a set of numerical values expressing the values of the frequency spectra corresponding to a plurality of frequencies are obtained as the codes in the step (a).

In the authentication method according to the sixth aspect, the set of the numerical values expressing the values of the frequency spectra corresponding to the plurality of frequencies are obtained as the authentication signal, whereby the authentication signal can be generated by employing a simple circuit.

According to a seventh aspect of the present invention, the semiconductor element has at least one MOSFET.

In the authentication method according to the seventh aspect, the semiconductor element employed as the object of extraction of the authentication signal has the MOSFET, whereby an authentication signal remarkably varying with each semiconductor element can be obtained.

According to an eight aspect of the present invention, an authentication apparatus comprises an authentication signal extraction part generating and outputting an authentication signal with respect to a detachably connected semiconductor element on the basis of its electric noise, a storage part storing at least one registered authentication signal each comparable with the authentication signal, a comparison part comparing the authentication signal output from the authentication signal extraction part with at least one registered authentication signal stored in the storage part, and a control part making the comparison part compare the authentication signal output from the authentication signal extraction part with each of at least one registered authentication signal stored in the storage part for executing authentication processing determining coincidence in any comparison.

In the authentication apparatus according to the eighth aspect, the electric noise of the semiconductor element is specific to each element, and hence the authentication signal obtained on the basis thereof is also specific to each element. Therefore, it is not necessary to form a nonvolatile memory or write the authentication signal for implementing authentication but the semiconductor element may simply be manufactured through the same manufacturing steps. Thus, authentication can be simply performed at a low cost.

According to a ninth aspect of the present invention, the control part selectively executes the authentication processing and registration processing making the storage part store the authentication signal output from the authentication signal extraction part as one of at least one registered authentication signal.

In the authentication apparatus according to the ninth aspect, a semiconductor element for which an authentication signal has been obtained can be distinguished from other ones to be authenticated.

According to a tenth aspect of the present invention, the control part selectively executes the authentication processing and registration processing making the comparison part compare the authentication signal output from the authentication signal extraction part with each of at least one registered authentication signal stored in the storage part for making the storage part store the authentication signal only when no coincidence is recognized in any comparison.

In the authentication apparatus according to the tenth aspect, an authentication signal intended to be newly registered is registered only when there is no registered authentication signal coinciding with the authentication signal, whereby double registration can be prevented.

According to an eleventh aspect of the present invention, the authentication signal extraction part measures the electric noise with respect to the semiconductor element thereby generating a code or codes depending on the frequency spectrum of the electric noise and outputting the code or codes as the authentication signal.

In the authentication apparatus according to the eleventh aspect, a code varying with each semiconductor element while reflecting noise specific to the semiconductor element is obtained as the authentication signal.

According to a twelfth aspect of the present invention, the authentication signal extraction part measures, with respect to an element comprising a plurality of unit semiconductor elements as the semiconductor element, electric noise of the respective ones of the plurality of unit semiconductor elements thereby obtaining codes depending on the frequency spectra of the electric noise and outputting a set of the codes as the authentication signal.

In the authentication apparatus according to the twelfth aspect, the codes depending on the frequency spectra of the plurality of unit semiconductor elements are obtained as the authentication signal, whereby it is possible to reduce such a possibility that the same authentication signal is obtained although the semiconductor elements are different from each other. Thus, the range of users requiring authentication can be further enlarged.

According to a thirteenth aspect of the present invention, the authentication signal extraction part generates a set of numerical values expressing the values of the frequency spectra corresponding to a plurality of frequencies as the codes.

In the authentication apparatus according to the thirteenth aspect, the set of the numerical values expressing the values of the frequency spectra corresponding to the plurality of frequencies are obtained as the authentication signal, whereby the authentication signal extraction part can be formed by a simple circuit.

According to a fourteenth aspect of the present invention, an authentication system comprises a terminal having an authentication signal extraction part generating and outputting an authentication signal with respect to a detachably connected semiconductor element on the basis of its electric noise and common carrier equipment, connected to the terminal through a communication line, having a storage part storing at least one registered authentication signal each comparable with the authentication signal, a comparison part comparing the authentication signal output from the authentication signal extraction part with at least one registered authentication signal stored in the storage part and a control part making the comparison part compare the authentication signal output from the authentication signal extraction part with each of at least one registered authentication signal stored in the storage part for executing authentication processing determining coincidence in any comparison.

In the authentication system according to the fourteenth aspect, the electric noise of the semiconductor element is specific to each element, and hence the authentication signal obtained on the basis thereof is also specific to each element. Therefore, it is not necessary to form a nonvolatile memory or write the authentication signal for implementing authentication but the semiconductor element may simply be manufactured through the same manufacturing steps. Thus, authentication can be simply performed at a low cost. Further, the terminal is connected with the common carrier equipment through the communication line, whereby the user can be authenticated for enjoying services provided by the common carrier at a long distance.

According to a fifteenth aspect of the present invention, an IC card comprises a semiconductor device having an integrated circuit and a semiconductor element built into the same semiconductor substrate and a terminal group including a plurality of terminals connected to the semiconductor element for enabling connection between the semiconductor device and the exterior.

In the IC card according to the fifteenth aspect, the semiconductor element for authentication is built into the same semiconductor substrate along with the integrated circuit, whereby the cost for forming the semiconductor element for authentication can be reduced.

According to a sixteenth aspect of the present invention, the IC card further comprises a switching element interposed between the semiconductor element and at least one of the plurality of terminals, and the terminal group further includes a terminal relaying a signal controlling the switching element.

The IC card according to the sixteenth aspect comprises the switching element which can be controlled through the terminal, whereby the semiconductor element for authentication can be protected against static electricity or the like so that noise characteristics can be stabilized.

According to a seventeenth aspect of the present invention, the semiconductor element has at least one MOSFET.

In the IC card according to the seventeenth aspect, the semiconductor element has the MOSFET, whereby an authentication signal remarkably varying with each semiconductor element can be obtained.

An object of the present invention is to provide an authentication method, an authentication apparatus, an authentication system and an IC card requiring neither formation of a nonvolatile memory nor writing of an authentication signal.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Outline of Embodiments

A semiconductor element such as a transistor element, a resistive element or the like has specific electric noise. Therefore, the frequency spectrum of the electric noise varies with individual semiconductor elements. Specifically, when a number of identical semiconductor elements are manufactured through the same manufacturing steps under the same design, the frequency spectra of electric noise vary with the individual semiconductor elements.

According to the present invention, the frequency spectrum of electric noise specific to a semiconductor element is utilized as an authentication signal as if the same is a "fingerprint" specific to the semiconductor element on the basis of the aforementioned fact. Therefore, it is not necessary to form a nonvolatile memory or write the authentication signal for implementing authentication but the semiconductor element may simply be manufactured through the same manufacturing steps. Thus, authentication can be simply performed at a low cost. Further, the semiconductor element for authentication can be built into the same semiconductor substrate along with an integrated circuit not directed to authentication, thereby further reducing the cost.

Embodiment 1

Figure 1:
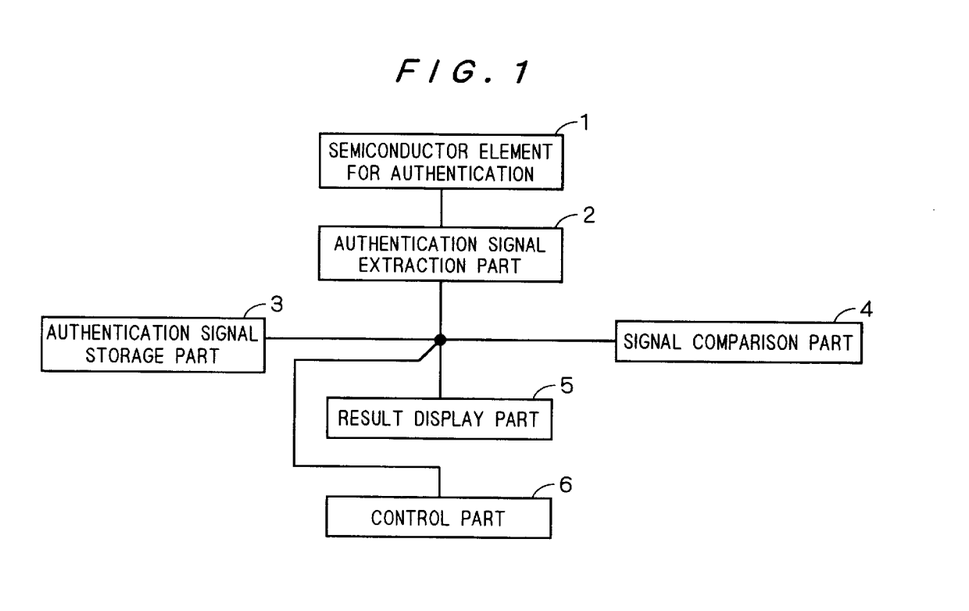
FIG. 1 is a block diagram of an apparatus suitable for a method according to an embodiment 1 of the present invention.

FIG. 1 is a block diagram showing the structure of an authentication apparatus for implementing an authentication method according to an embodiment 1 of the present invention. This authentication apparatus comprises an authentication signal extraction part 2, an authentication signal storage part 3, a signal comparison part 4, a result display part 5 and a control part 6.

The semiconductor element 1 for authentication, which is built into an IC card, for example, is detachably connected to the authentication signal extraction part 2 to be used. The authentication signal extraction part 2 measures electric noise specific to the semiconductor element 1 for authentication thereby generating codes depending on the frequency spectrum of this electric noise and outputting the same as an authentication signal.

Figure 2:
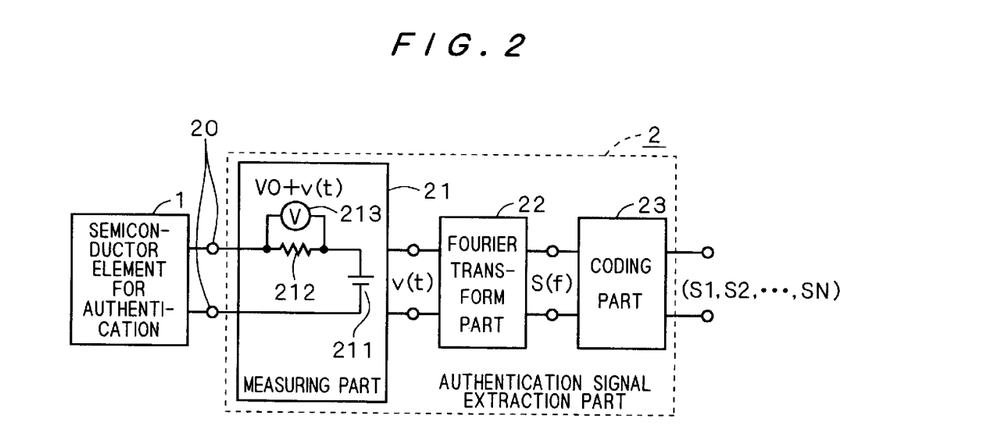
FIG. 2 is an internal block diagram of an authentication signal extraction part shown in FIG. 1.

FIG. 2 is a block diagram showing an exemplary internal structure of the authentication signal extraction part 2. The authentication signal extraction part 2 comprises a set of terminals 20 to which the semiconductor element 1 for authentication is detachably connected, a measuring part 21 measuring the electric noise of the semiconductor element 1 for authentication, a Fourier transform part 22 Fourier-transforming the measured electric noise thereby obtaining the frequency spectrum of the electric noise and a coding part 23 generating the codes from the frequency spectrum and outputting the same as the authentication signal.

The measuring part 21 comprises a voltage source 211 supplying a voltage to the semiconductor element 1, a resistive element 212 interposed between the voltage source 211 and one of the set of terminals 20 for detecting a current flowing in the semiconductor element 1 and a voltmeter 213 detecting a voltage drop caused across the resistive element 212. While the voltmeter 213 detects a dc component V0 and an ac component v(t), the ac component v(t) reflects the electric noise of the semiconductor element 1. The Fourier transform part 22 Fourier-transforms the electric noise detected as the ac component v(t), thereby obtaining a frequency spectrum S(f) of the electric noise as illustrated in a graph of FIG. 3. As described above, the frequency spectrum S(f) varies with each semiconductor element 1.

Figure 3:
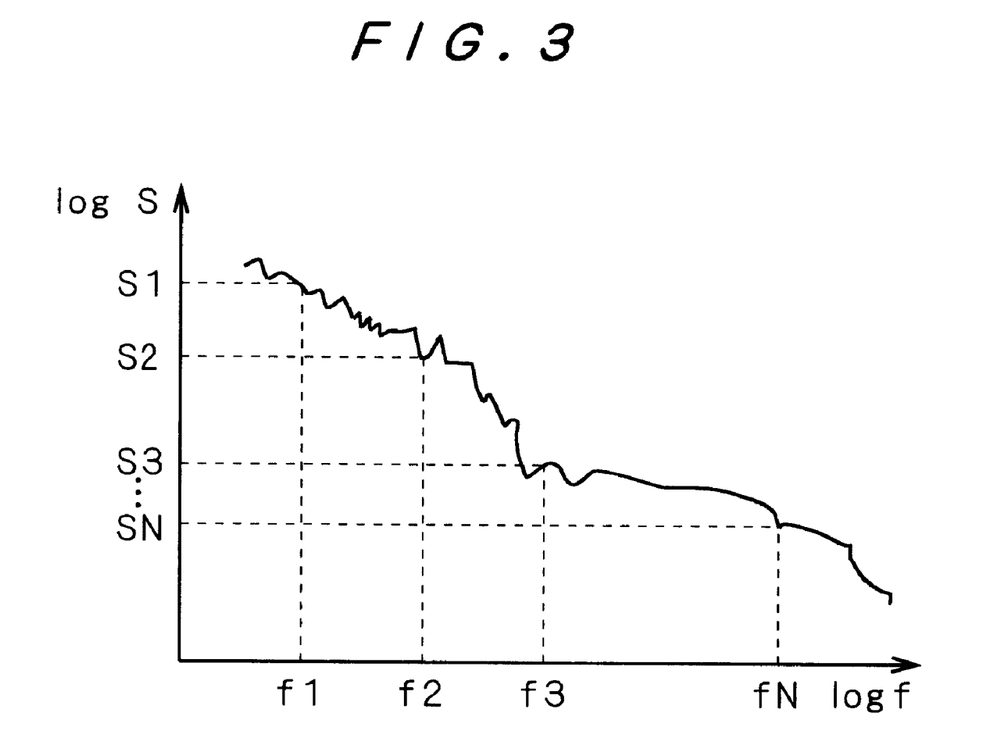
FIG. 3 is a graph showing an exemplary output signal from a Fourier transform part shown in FIG. 2.

The coding part 23 comprises an A-D converter (not shown), for example, extracts values S1 to SN at N (N≧2) frequencies illustrated in FIG. 3 and generates a set of digital signals numerically expressing these values as codes. These are hereinafter referred to as codes S1 to SN.

Referring again to FIG. 1, the authentication signal storage part 3 records the authentication signal formed by the set of the codes S1 to SN as a registered authentication signal through registration processing performed in advance of authentication processing. The signal comparison part 4 compares the authentication signal output from the authentication signal extraction part 2 with the registered authentication signal stored in the authentication signal storage part 3 and determines coincidence therebetween. The signal comparison part 2 may determine whether or not the authentication signal and the registered authentication signal coincide with each other with reference to all codes S1 to SN or whether or not the signals approximate each other within an error range of ±1 with reference to each of these codes S1 to SN, for example. An error in authentication resulting from an error in measurement can be avoided by employing the latter determination. Throughout the specification, "coincidence" is not restricted to complete coincidence but includes both cases.

The result display part 5 displays the result of the comparison. The control part 6 controls operations of the authentication signal extraction part 2, the authentication signal storage part 3, the signal comparison part 4 and the result display part 5 to selectively execute either the registration processing or the authentication processing on the basis of an external instruction such as an instruction from a user or a common carrier, for example. Operations of the control part 6 are now described in detail with reference to FIGS. 4 and 5.

Figure 4:
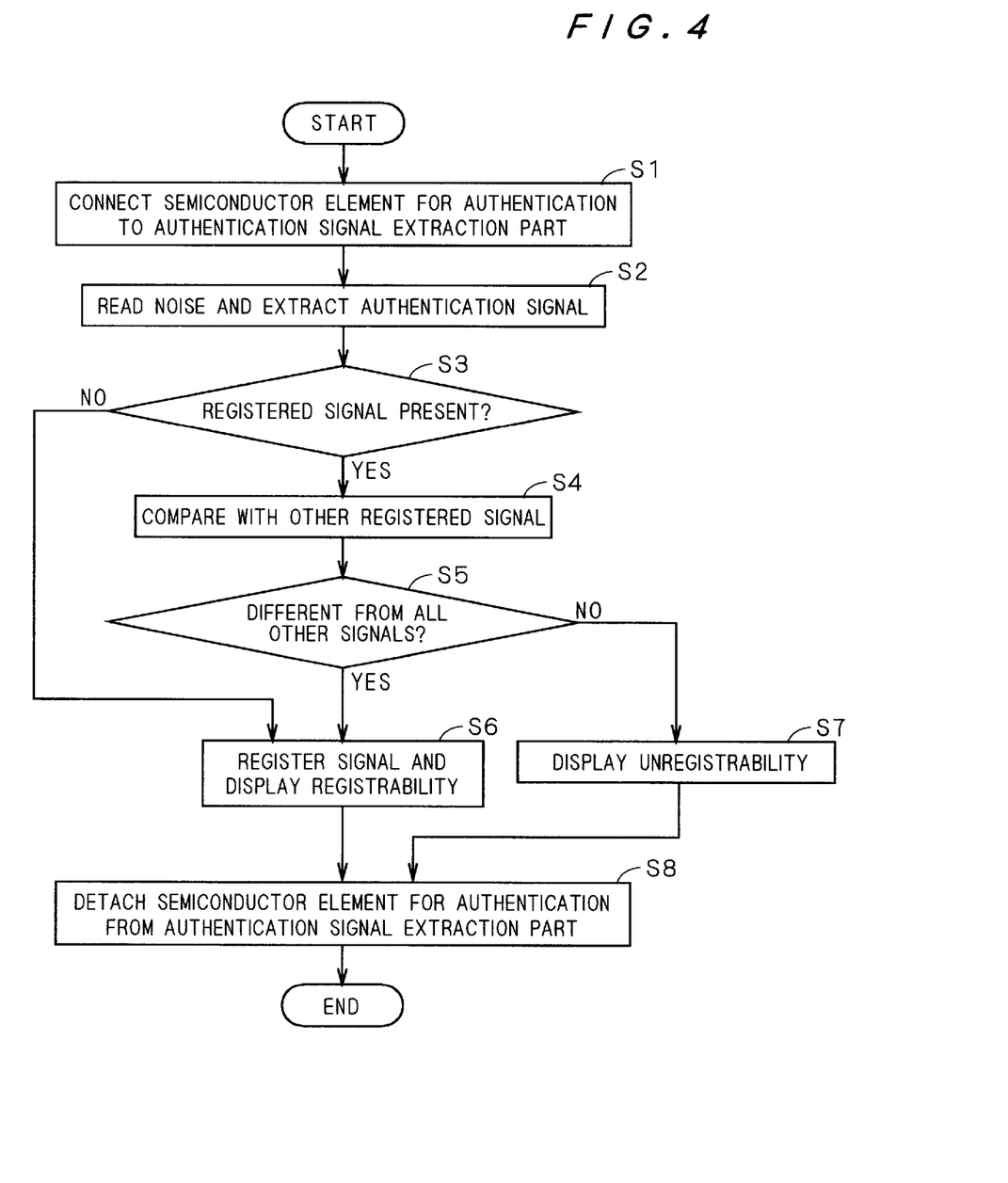
FIGS. 4 and 5 are flow charts showing the procedures of the method according to the embodiment 1.

FIG. 4 is a flow chart showing the procedure of the registration processing. When the registration processing is selected, the control part 6 controls the respective parts of the authentication apparatus to implement operations along this flow chart. When the registration processing is started, the user connects the semiconductor element 1 for authentication to the authentication signal extraction part 2 (step S1). Then, the authentication signal extraction part 2 measures the electric noise of the semiconductor element 1 for authentication and outputs the authentication signal (step S2).

Then, the authentication signal storage part 3 is retrieved for determining whether or not registered authentication signals are present (step S3). When the determination is of YES, each registered authentication signal is compared with the authentication signal output from the authentication signal extraction part 2 (step S4). On the basis of the result of the comparison, whether or not coincidence is recognized in any comparison, i.e., whether or not there is a registered authentication signal coinciding with the authentication signal is determined (step S5).

When a positive determination (YES) is obtained at the step S5, the authentication signal extraction part 2 records the authentication signal as a new registered authentication signal while the result display part 5 displays this registration (step S6). When a negative determination (NO) is obtained, on the other hand, the authentication signal extraction part 2 does not record the authentication signal but the result display part 5 displays unregistrability (step S7). Also when the determination at the step S3 is of NO, the processing at the step S6 is executed.

When the processing of the step S6 or S7 is terminated, the user detaches the semiconductor element 1 for authentication from the authentication signal extraction part 2 (step S8), thereby completing the registration processing. In the registration processing shown in FIG. 4, as hereinabove described, the authentication signal to be newly registered is compared with the registered authentication signals, thereby avoiding double registration of the same authentication signal.

Figure 5:
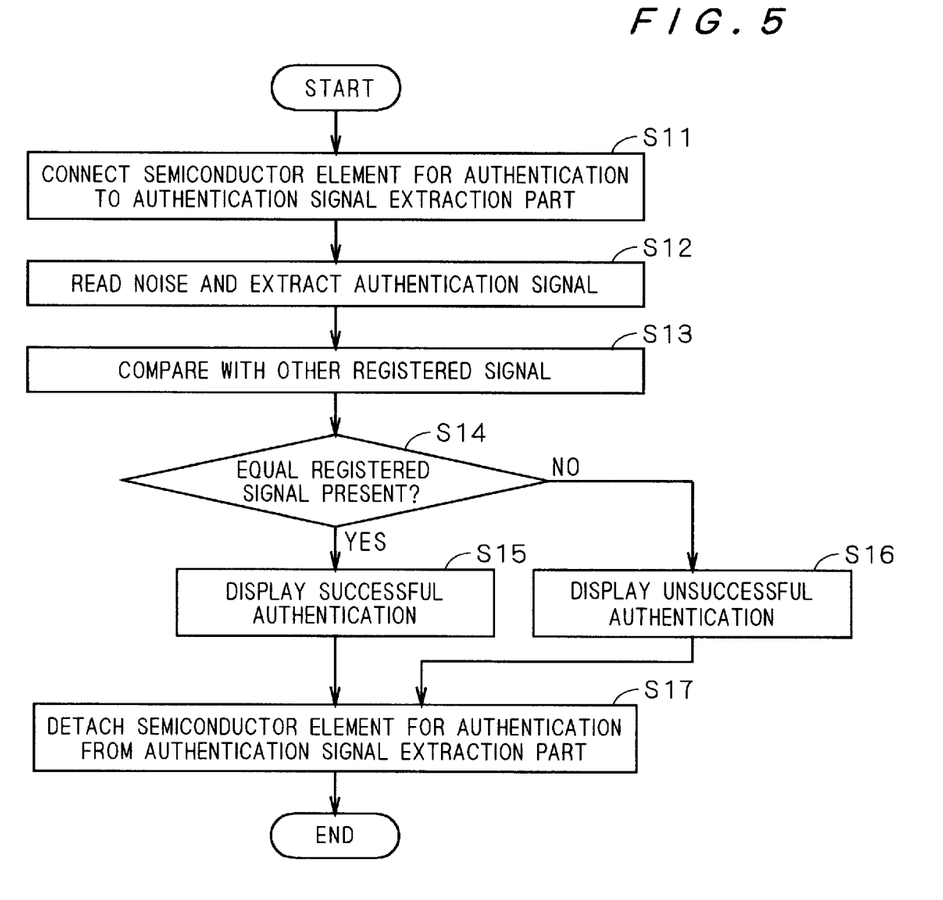

FIG. 5 is a flow chart showing the procedure of the authentication processing. When the authentication processing is selected, the control part 6 controls the respective parts of the authentication apparatus to implement operations along this flow chart. When the authentication processing is started, the user connects the semiconductor element 1 for authentication to the authentication signal extraction part 2 (step S11). Then, the authentication signal extraction part 2 measures the electric noise of the semiconductor element 1 for authentication and outputs the authentication signal (step S12).

Then, each of the registered authentication signals recorded in the authentication signal storage part 3 is compared with the authentication signal output from the authentication signal extraction part 2 (step S13). On the basis of the result of the comparison, whether or not coincidence is recognized in any comparison, i.e., whether or not there is a registered authentication signal coinciding with the authentication signal is determined (step S14).

When a positive determination (YES) is obtained at the step S14, the result display part 5 displays successful authentication (step S15). When a negative determination (NO) is obtained, the result display part 5 displays unsuccessful authentication (step S16). When the processing of the step S15 or S16 is terminated, the user detaches the semiconductor element 1 for authentication from the authentication signal extraction part 2 (step S17), thereby completing the authentication processing.

As hereinabove described, authentication is executed in the authentication processing shown in FIG. 5 by comparing the authentication signal (codes S1 to SN) depending on the frequency spectrum of the electric noise of the semiconductor element 1 with the registered authentication signals.

Embodiment 2

Figure 6:
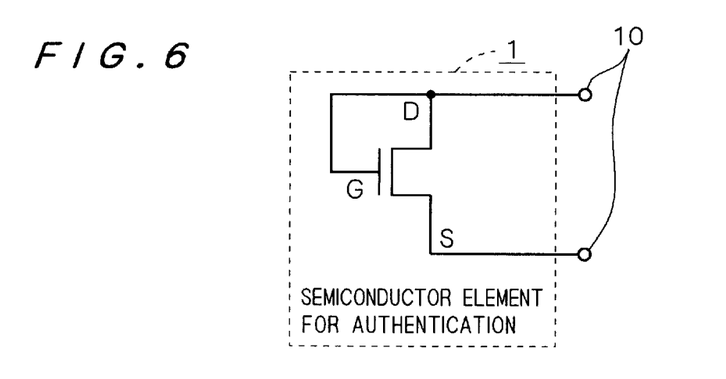
FIG. 6 is a circuit diagram of a semiconductor element for authentication suitable for a method according to an embodiment 2 of the present invention.
Figure 7:
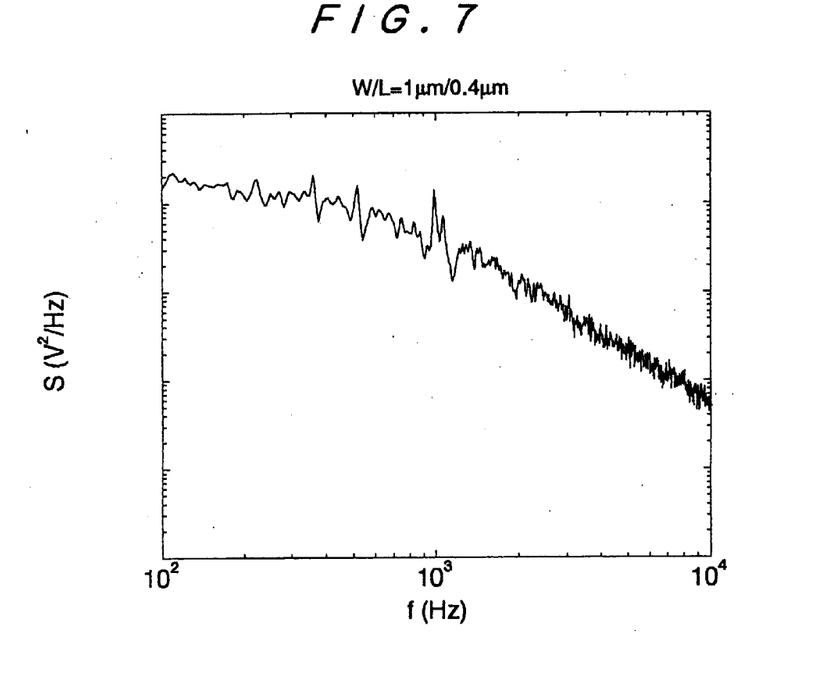
FIGS. 7 to 12 are graphs illustrating exemplary frequency spectra of MOSFETs similar to that shown in FIG. 6.
Figure 8:
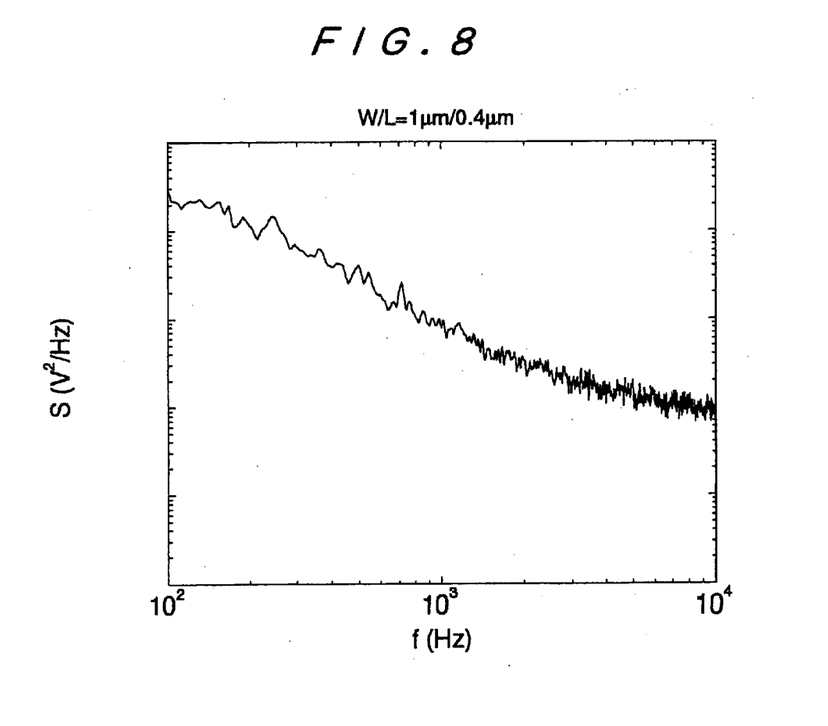
Figure 9:
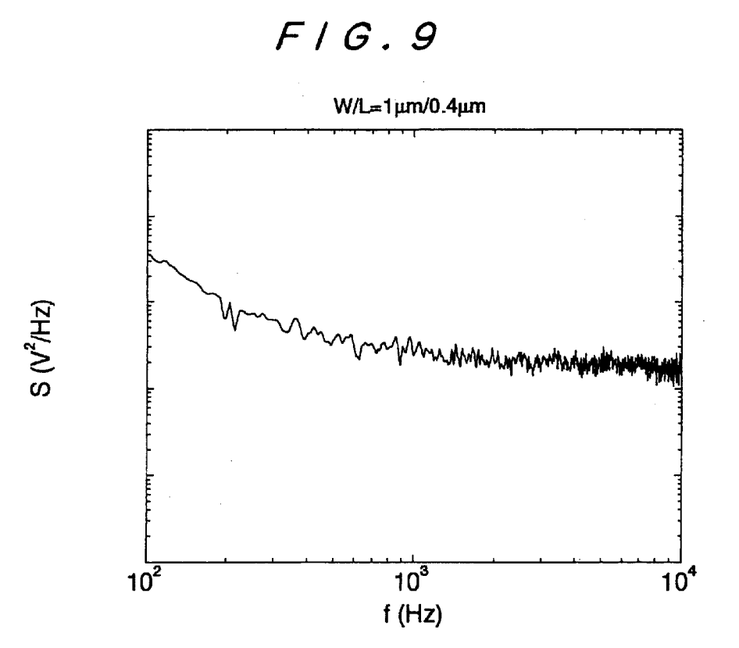
Figure 10:
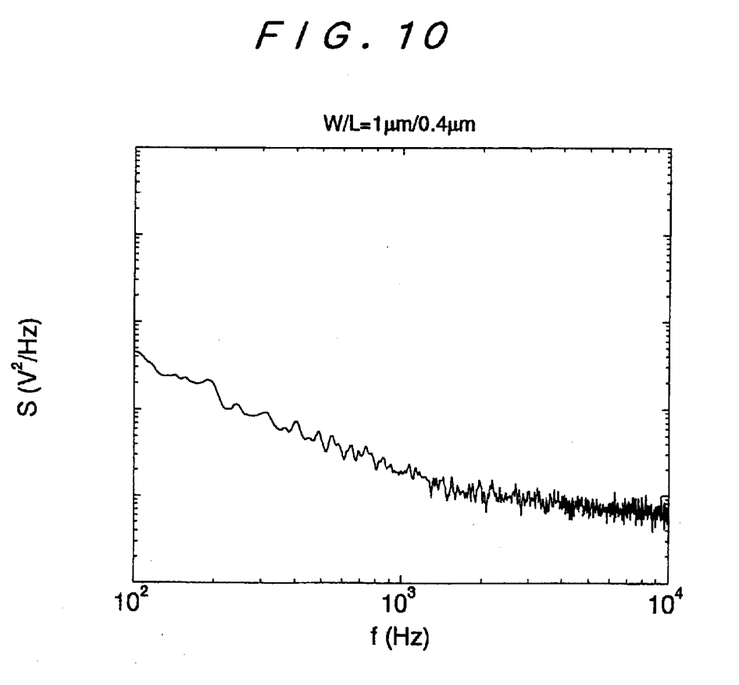
Figure 11:
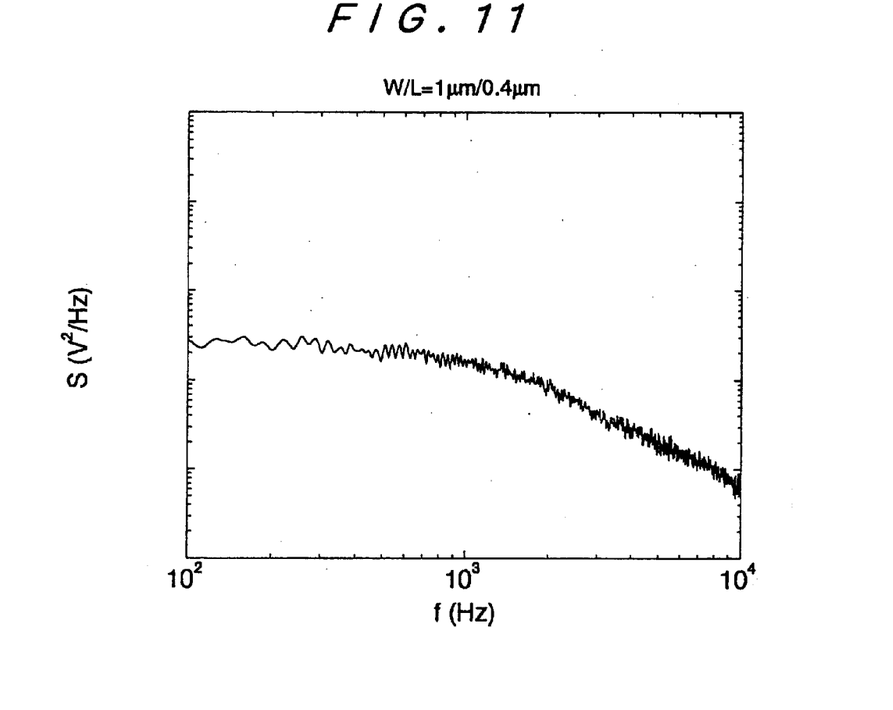
Figure 12:
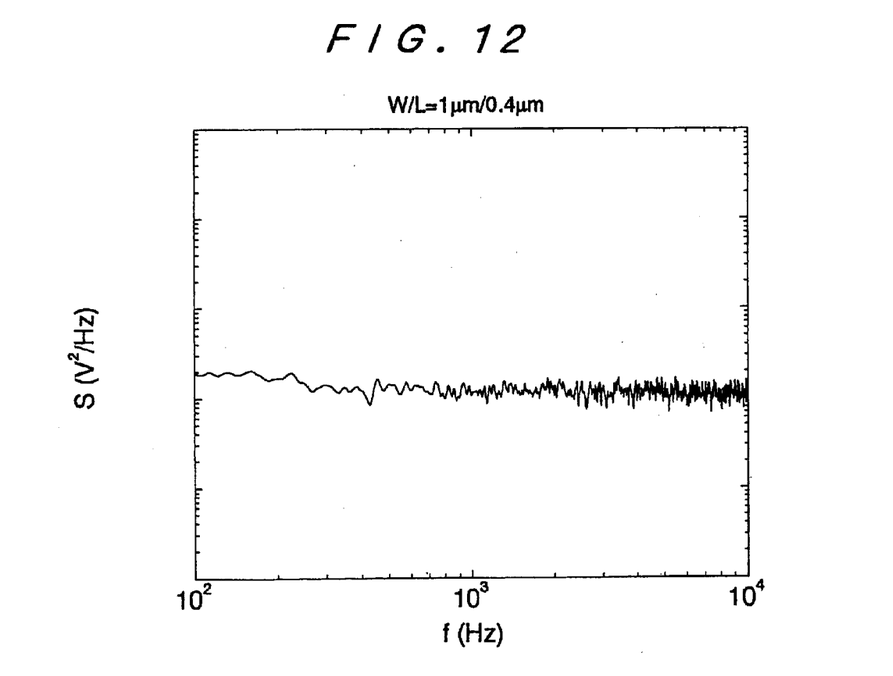

FIG. 6 is a circuit diagram showing the structure of a semiconductor element 1 for authentication for implementing an authentication method according to an embodiment 2 of the present invention. This semiconductor element 1 for authentication is formed as a MOSFET. A drain electrode D and a source electrode S of the MOSFET are connected to a set of terminals 10 detachably connected to a set of terminals 20 (FIG. 2) of an authentication signal extraction part 2. A gate electrode G is connected to the drain electrode D. When the authentication signal extraction part 2 applies a voltage to the terminals 10, therefore, the MOSFET is turned on and a drain current flows. A measuring part 21 (FIG. 2) measures electric noise superposed on this drain current.

In the MOSFET, the drain current flows along an interface between silicon (Si) and a silicon oxide ($SiO_2$), to cause such a phenomenon that levels present on the interface or in the silicon oxide capture or emit carriers. Therefore, the MOSFET has large noise as compared with another semiconductor element such as a bipolar transistor or a JFET. The number of the levels, which is proportionate to the gate area, is reduced as the gate area is reduced while relative statistical fluctuation of the number of the levels is increased. Therefore, a MOSFET having a small gate area particularly has large noise and large dispersion of the noise for desirably serving as the semiconductor element 1 for authentication.

FIGS. 7 to 12 are graphs showing results obtained by measuring the frequency spectra of electric noise of six identical MOSFETs having a gate width W of 1 $\mu$m and a gate length L of 0.4 $\mu$m manufactured through the same manufacturing steps. As shown in FIGS. 7 to 12, the frequency spectra of the electric noise of the six MOSFETs are different from one another.

For example, sets of values (S1, S2) of the frequency spectra with respect to two frequencies f1=1×10$^3$ kHz and f2=5×10$^3$ kHz are (1.2×10$^4$, 2×10$^2$), (1.0×10$^3$, 1.2×10$^2$), (3×10$^2$, 2×10$^2$), (2×10$^2$, 8×10$^0$), (1.7×10$^2$, 2×10$^1$) and (1×10$^2$, 1×10$^2$) in FIGS. 7 to 12 respectively. The vertical axes of FIGS. 7 to 12, expressed in arbitrary units common to each other, express the aforementioned values (S1, S2) on the assumption that the values on the lower and upper ends of each graph are 1×10$^0$ (=1) and 1×10$^5$ respectively. It is understood from the above values (S1, S2) that the set of the values of the frequency spectra with respect to only two frequencies vary with the individual MOSFETs.

Embodiment 3

Figure 13:
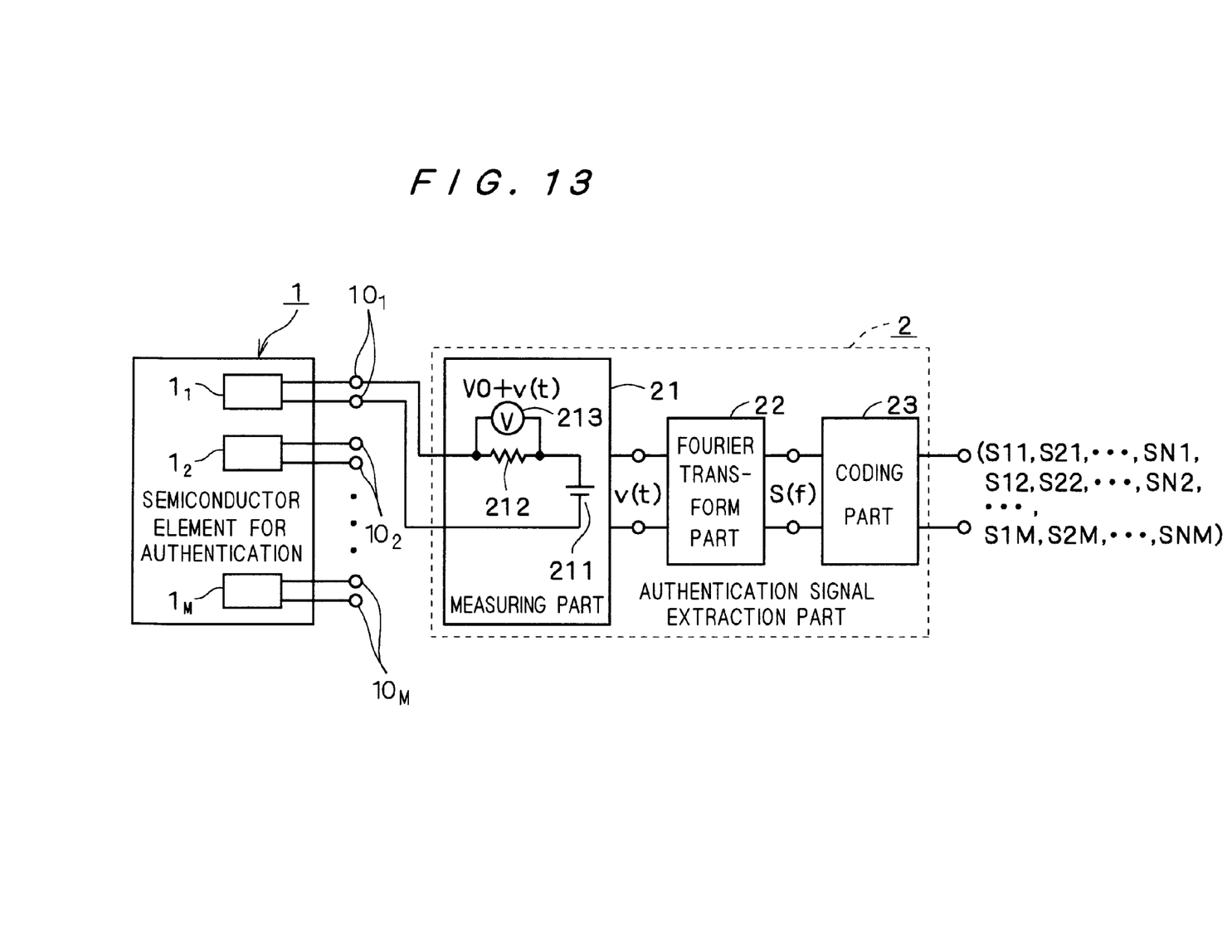
FIG. 13 is an internal block diagram of a semiconductor element for authentication and an authentication signal extraction part suitable for a method according to an embodiment 3 of the present invention.

FIG. 13 is a block diagram showing the structures of a semiconductor element 1 for authentication and an authentication signal extraction part 2 for implementing an authentication method according to an embodiment 3 of the present invention. The semiconductor element 1 for authentication comprises M (M≧2) unit semiconductor elements $1_1$ to $1_M$, which are connected to M terminals $10_1$ to $10_M$ respectively. Each of the unit semiconductor elements $1_1$ to $1_M$ is formed as the MOSFET shown in FIG. 6, for example.

A measuring part 21 provided on the authentication signal extraction part 2 measures electric noise of each of the unit semiconductor elements $1_1$ to $1_M$. To this end, the measuring part 21 may comprise a selector (not shown) for successively measuring the electric noise of the unit semiconductor elements $1_1$ to $1_M$ one by one, or may comprise M sets of voltage sources 211, resistive elements 212 and voltmeters 213 for simultaneously measuring the electric noise of all unit semiconductor elements $1_1$ to $1_M$.

A Fourier transform part 22 individually Fourier-transforms the M electric noise detected from the unit semiconductor elements $1_1$ to $1_M$, thereby obtaining M frequency spectra. A coding part 23 extracts values corresponding to N (N≧2) frequencies f1 to fN as to each of the M frequency spectra. Thus, a set of M×N codes S11 to SN1, S12 to SN2, ..., S1M to SNM are output as an authentication signal.

As hereinabove described, the authentication apparatus utilizing the frequency spectra of the electric noise of a plurality of unit semiconductor elements as an authentication signal can reduce such a possibility that the same authentication signal is obtained from another semiconductor element 1 for authentication. In other words, the authentication apparatus can further enlarge the range of users requiring authentication.

Embodiment 4

Figure 14:
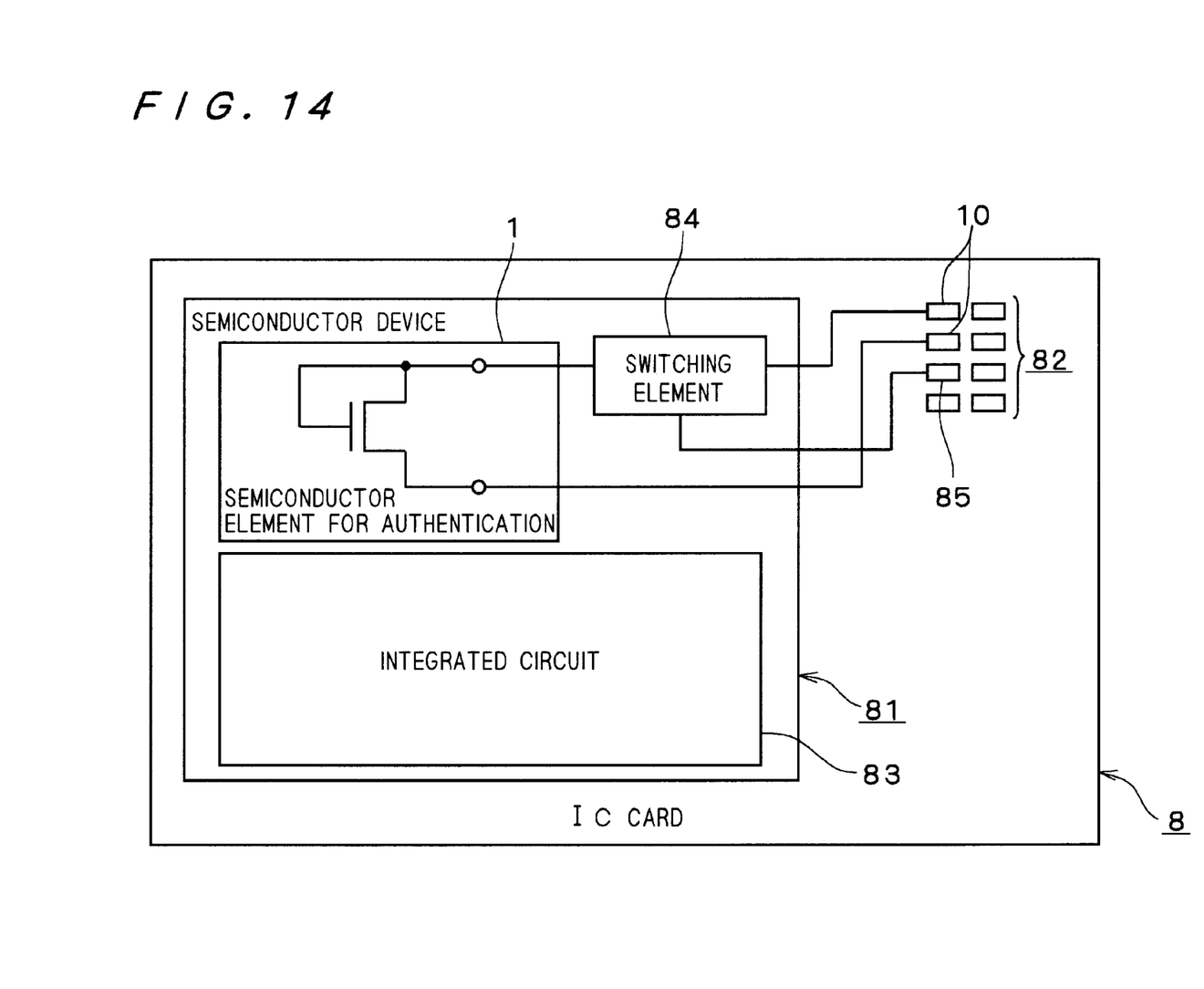
FIG. 14 is a block diagram of an IC card according to an embodiment 4 of the present invention.

FIG. 14 is a block diagram showing the structure of an IC card 8 according to an embodiment 4 of the present invention. This IC card 8 comprises a semiconductor device 81 and a terminal group 82. The semiconductor device 81 has an integrated circuit 83 formed for an object other than authentication and a semiconductor element 1 for authentication. The integrated circuit 83 and the semiconductor element 1 for authentication are built into the same semiconductor substrate. In other words, the semiconductor element 1 for authentication is formed as part of an integrated circuit built into a single semiconductor substrate. Thus, the semiconductor element 1 for authentication can be formed at a substantially ignorable manufacturing cost.

In the example shown in FIG. 14, the semiconductor element 1 for authentication is formed as a MOSFET. Therefore, a MOSFET forming part of an integrated circuit formed as a gate array may be utilized as the semiconductor element 1 for authentication so that the remaining principal part is utilized as the integrated circuit 83.

The terminal group 82 is connected to the semiconductor device 81, for relaying the semiconductor device 81 with the exterior. The terminal group 82 includes a terminal 10 connected with the semiconductor element 1 for authentication for enabling connection with an authentication signal extraction part 2 (FIGS. 1 and 2).

Preferably, the semiconductor device 81 may further comprise a switching element 84, and a terminal 85 relaying a signal on-off controlling the switching element 84 may be provided as part of the terminal group 82, as shown in FIG. 14. Thus, the semiconductor element 1 for authentication can be protected against static electricity or the like so that the noise characteristics thereof can be stabilized.

The terminal 85 can be connected with the authentication signal extraction part 2 along with the terminal 10. In this case, the authentication signal extraction part 2 transmits a control signal to the terminal 85 to turn on the switching element 84 for a period for measuring electric noise of the semiconductor element 1 under control by a control part 6 (FIG. 1).

Embodiment 5

Figure 15:
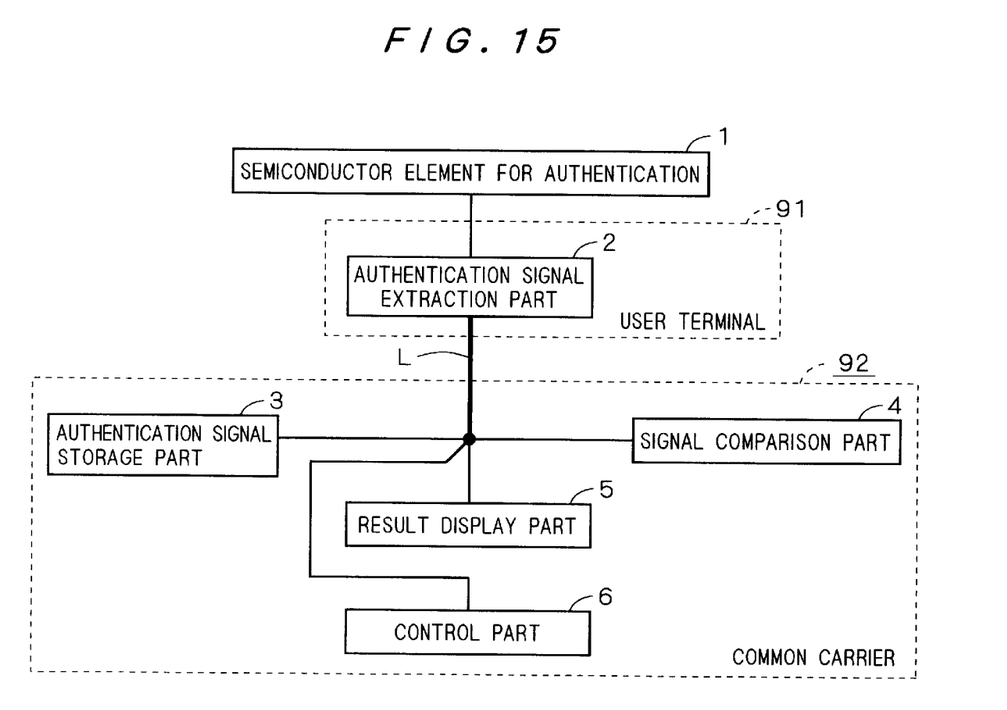
FIG. 15 is a block diagram of an authentication system according to an embodiment 5 of the present invention.

FIG. 15 is a block diagram showing the structure of an authentication system according to an embodiment 5 of the present invention. In this system, an authentication signal extraction part 2 is built into a user terminal 91, while an authentication signal storage part 3, a signal comparison part 4, a result display part 5 and a control part 6 are built into common carrier equipment 92. The user terminal 91 and the common carrier equipment 92 are connected with each other through a communication line L. The communication line L can be implemented by a public telephone line, a dedicated line or the Internet, for example.

By utilizing this authentication system, the user can be authenticated for enjoying services provided by the common carrier at a long distance. Not a single but a plurality of user terminals 91 may be connected to single carrier equipment 92, thereby providing convenience to users in a wider area.

Modifications (1) While the authentication signal extraction part 2 shown in FIG. 2 comprises the measuring part 21, the Fourier transform part 22 and the coding part 23, the configuration of the authentication signal extraction part 2 is not restricted to this example. For example, it is possible to pass the electric noise measured in the measuring part 21 through a bandpass filter for extracting electric noise at specific frequencies f1 to fN and digitizing the same through an A-D converter, thereby obtaining codes S1 to SN. Further, it is also possible to obtain codes by treating the curve in FIG. 3 as an image and converting the same to an image signal. In either examples, codes depending on the frequency spectrum of the electric noise specific to the semiconductor element are obtained.

(2) While the authentication signal storage part 3 records the authentication signal obtained in the authentication signal extraction part 2 as the registered authentication signal in each of the aforementioned embodiments, recording may alternatively be performed by externally inputting a registered authentication signal. For example, it is possible to extract an authentication signal through another device formed identically to the authentication signal extraction part 2 and send the data to the common carrier so that the common carrier directly records the transmitted authentication signal in the authentication signal storage part 3 without through the authentication signal extraction part 2.

While the invention has been shown and described in detail, the foregoing description is in all aspects illustrative and not restrictive. It is therefore understood that numerous modifications and variations can be devised without departing from the scope of the invention.

What is claimed is:

1. An authentication apparatus comprising:

an authentication signal extraction part generating and outputting an authentication signal with respect to a detachably connected semiconductor element on the basis of its electric noise;

a storage part storing at least one registered authentication signal each comparable with said authentication signal;

a comparison part comparing said authentication signal output from said authentication signal extraction part with said at least one registered authentication signal stored in said storage part; and a control part making said comparison part compare said authentication signal output from said authentication signal extraction part with each of said at least one registered authentication signal stored in said storage part for executing authentication processing determining coincidence in any comparison.

2. The authentication apparatus according to claim 1, wherein said control part selectively executes said authentication processing and registration processing making said storage part store said authentication signal output from said authentication signal extraction part as one of said at least one registered authentication signal.

3. The authentication apparatus according to claim 1, wherein
said control part selectively executes said authentication processing and registration processing making said comparison part compare said authentication signal output from said authentication signal extraction part with each of said at least one registered authentication signal stored in said storage part for making said storage part store said authentication signal only when no coincidence is recognized in any comparison.

4. The authentication apparatus according to claim 1, wherein
said authentication signal extraction part measures said electric noise with respect to said semiconductor element thereby generating a code or codes depending on the frequency spectrum of said electric noise and outputting said code or codes as said authentication signal.

5. The authentication apparatus according to claim 4, wherein
said authentication signal extraction part measures, with respect to an element comprising a plurality of unit semiconductor elements as said semiconductor element, electric noise of the respective ones of said plurality of unit semiconductor elements thereby obtaining codes depending on the frequency spectra of said electric noise and outputting a set of said codes as said authentication signal.

6. The authentication apparatus according to claim 4, wherein
said authentication signal extraction part generates a set of numerical values expressing the values of said frequency spectra corresponding to a plurality of frequencies as said codes.

7. An authentication system comprising:
a terminal having an authentication signal extraction part generating and outputting an authentication signal with respect to a detachably connected semiconductor element on the basis of its electric noise; and common carrier equipment, connected to said terminal through a communication line, having:
a storage part storing at least one registered authentication signal each comparable with said authentication signal,
a comparison part comparing said authentication signal output from said authentication signal extraction part with said at least one registered authentication signal stored in said storage part, and
a control part making said comparison part compare said authentication signal output from said authentication signal extraction part with each of said at least one registered authentication signal stored in said storage part for executing authentication processing determining coincidence in any comparison.

8. An IC card comprising:
a semiconductor device having an integrated circuit and a semiconductor element built into the same semiconductor substrate; and
a terminal group including a plurality of terminals connected to said semiconductor element for enabling connection between said semiconductor device and the exterior,
wherein said electric noise of said semiconductor element is derived from said plurality of terminals to the exterior and converted into said authentication signal.

9. The IC card according to claim 8, further comprising a switching element interposed between said semiconductor element and at least one of said plurality of terminals, wherein
said terminal group further includes a terminal relaying a signal controlling said switching element.

10. The IC card according to claim 9, wherein
said semiconductor element has at least one MOSFET.

* * * * *